Patented Oct. 12, 1937

2,095,673

UNITED STATES PATENT OFFICE 2,095,673

METHOD OF TREATING RUBBER

Henry R. Minor, Oak Park, Ill., assignor, by mesne assignments, to Industrial Process Corporation, Saratoga Springs, N. Y., a corporation of New York No Drawing. Application April 6, 1934, Serial No. 719,301

12 Claims. (Cl. 18—50)

This invention relates to a method of treating rubber and more particularly to a method of breaking down rubber and of incorporating softening agents thereinto without the necessity of prolonged milling at heavy pressures.

Heretofore, the general practice in "breaking down" or plasticizing crude rubber, and in mixing compounding ingredients therein has been to mill the rubber between rolls or in a mixer, such as the "Banbury" mixer or the "Gordon" plasticizer, for a considerable period of time until the rubber is plasticized, and then to incorporate into the plasticized rubber in the mill or mixer the various pigments, fillers, "wetting" agents, softening agents, vulcanizing agents, accelerators, antioxidants, and other treating agents.

The milling-in of these compounding ingredients requires considerable time, and much difficulty is encountered especially in stocks heavily loaded with pigments, such as carbon black, and toughening agents, due to scorching, blistering and dry-lapping of the stock in the mill and subsequently in the calendering or sheeting operations. Wetting or softening agents have been used along with the pigments to promote the latter's dispersion in the mix, but even with the use of such agents, the results have not been entirely satisfactory.

The quantities of carbon or gas black, for example, which may be successfully milled into a rubber stock are limited because of this tendency of the stock to scorch, blister or dry-lap in the mill and in the subsequent calendering or sheeting operations.

Furthermore, mills and mixers used for this breaking down and mixing of rubber stocks must be of a "heavy duty" type and consume much power. The large consumption of power by mills in the breaking down and mixing of rubber stocks has given rise to suggestions that it might be possible to break down or plasticize rubber in the presence of inert gases, such as steam, but such processes have, so far as the present inventor is aware, not been commercially successful. The use of steam, for instance, introduces water into the rubber and necessitates an added step for its removal from the rubber.

I have now discovered that the breaking down or plasticizing of rubber may be satisfactorily carried out in the presence of carbon dioxide under elevated temperatures and pressures. Carbon dioxide acts differently from nitrogen, steam or other inert gas and is not to be considered as an equivalent of such inert gases.

I have further determined that various treating agents, such as softening agents which are volatile under the conditions obtaining, may be satisfactorily and efficiently dispersed throughout the body of the rubber stock by the use of carbon dioxide as a carrier and dispersing agent. By this means much of the time and power consumed in milling operations is saved and a rubber having improved qualities and characteristics is obtained.

Furthermore, carbon dioxide has a preservative effect on the protein content of the rubber and has the added advantage over steam or other gases that it penetrates rubber more quickly and is readily absorbed or adsorbed by the rubber without introducing moisture into the rubber mass.

It is therefore an important object of this invention to provide a method for treating rubber to cause a break down of the rubber by subjecting the raw or crude rubber to the action of carbon dioxide gas at depolymerizing temperatures and under super atmospheric pressures.

It is a further important object of this invention to provide a method for impregnating raw rubber with softening agents by the use of carbon dioxide gas under pressure and at an elevated temperature as a carrier and impregnating agent.

A further important object of this invention is to provide a method for breaking down rubber whereby a considerable saving in time, labor and power consumption over the use of mills alone for this purpose may be realized.

Other and further important objects of this invention will become apparent from the following description and appended claims.

In accordance with the present invention, raw or crude rubber is subjected to the action of carbon dioxide gas under pressures substantially higher than atmospheric and at elevated temperatures for a sufficient period of time to soften or depolymerize the rubber. As a result of this treatment, the stock is effectively broken down or plasticized and may be more easily milled and mixed with the compounding ingredients in a comparatively shorter time and with much less consumption of power.

Where softening agents are to be incorporated into rubber, this may be done more efficiently by my method by adding the softening agents, which are volatile under the conditions obtaining, to the raw rubber, without any substantial mixing, before subjecting the rubber mass to the carbon dioxide treatment. In this way, the carbon dioxide acts as a carrier and penetrating agent to disperse the softening agents, and the like, throughout the mass of the rubber and thus save subsequent consumption of power in the milling step. Furthermore, the preliminary introduction of the treating agents, and the like, into the rubber mass with the use of carbon dioxide as a carrier results in a rubber stock having superior qualities, greater tensile strength and greater uniformity.

In carrying out my invention, the raw rubber may suitably be in sheet form or may be cut into pieces of convenient size and enclosed in a vessel from which the air may or may not have been evacuated. The presence of small proportions of air in my method is not objectionable. Carbon dioxide is then introduced into the vessel and is maintained in the vessel at a pressure of between 25 and 100 lbs. per sq. in., and preferably at about 50 lbs. per sq. in. Pressures in excess of 100 lbs. per sq. in. give no especial added advantage.

The vessel may be heated, as by steam jacketed walls, to a temperature equivalent to that of steam at 100 lbs./sq. in. pressure and over, viz. to temperatures in excess of about 330° F. Temperatures sufficiently high to depolymerize the rubber under normal atmospheric conditions should be used for a period long enough to break down or plasticize the rubber. Actually, under the conditions obtaining, no substantial depolymerization of the rubber may take place, owing to the carbon dioxide pressure. The pressures, temperatures and times employed may be varied, as will be understood by skilled artisans; but a pressure of 50 lbs per sq. in., a temperature of 330 to 340° F. and a heating period of two to three hours have been used successfully. In general, the temperatures employed in my process are higher than those normally employed in the vulcanization of rubber compounds.

Various wetting and softening agents which are liquid and/or are volatile under the conditions obtaining may be incorporated into the rubber stock by the use of carbon dioxide as a carrier. Among the various wetting agents and rubber softening agents, generically termed "treating agents", may be mentioned oleic acid, pine tar, stearic acid, "Plastogen", acetic acid, and others. These are introduced in quantities equal to approximately 2 to 8% by weight of the rubber stock. Where the treating agents employed are liquid, they may be poured over the surface of the rubber in the proper proportion either before or after the rubber has been introduced into the pressure vessel.

While, in general, it is preferable in connection with the incorporation of wetting and softening agents into the rubber to use the same temperatures, pressures and times as were specified in the method of plasticizing the rubber described above, lower temperatures may be employed so long as they result in the volatilization of the treating agent, but the full plasticizing effect of the carbon dioxide may not be realized at temperatures below the depolymerizing temperature.

The carbon dioxide under pressure during the heat treatment of the rubber picks up the softening agent and, in penetrating the rubber mass, apparently carries with it the volatilized treating agent.

Then, upon release of the pressure, the treating ingredients remain behind substantially uniformly dispersed throughout the rubber mass, while the carbon dioxide is given off. The attraction of the rubber particles for these treating agents is apparently greater than the attraction of the carbon dioxide for the treating agents. It may be that the treating agents are actually condensed upon the surfaces of the rubber particles.

Where test specimens have been made up from rubber treated in accordance with my invention and compared with specimens made up in the usual fashion, it has been found that the time heretofore required to incorporate treating ingredients into the rubber stock on the mill has been entirely eliminated. Furthermore, for example, a specimen in which 2% of pine tar was added in the mill in the customary fashion gave a tensile strength of 4055 lbs. per sq. in. and an elongation of 665%, whereas when the pine tar was incorporated by my method, the tensile strength under identical conditions was 4440 lbs. per sq. in. and the elongation 660%, indicating a substantial improvement in tensile strength without any decrease in elongation. There is thus a very considerable improvement in the product as well as a reduction in the milling time.

Raw rubber, which has been plasticized by my process requires no milling other than the mere sheeting out of the material, such as is done anyway on pre-masticated rubber. Important economies are thus effected by the use of my process.

I am aware that numerous details of the process may be varied through a wide range without departing from the principles of this invention, and I, therefore, do not purpose limiting the patent granted hereon otherwise than necessitated by the prior art.

I claim as my invention:

1. The method of incorporating a softening agent in rubber, which comprises confining raw rubber and a softening agent to be incorporated into the rubber in an atmosphere of carbon dioxide at an elevated temperature and under a pressure of at least 50 lbs./sq. in. and releasing the pressure to obtain a rubber having said softening agent incorporated substantially uniformly therein.

2. The method of incorporating softening agents into rubber, which comprises subjecting raw rubber admixed with a softening agent to the penetrating action of carbon dioxide gas at a depolymerizing temperature and under a pressure of 50 lbs./sq. in. and over and releasing the pressure to obtain a treated rubber having said softening agent substantially uniformly dispersed therein.

3. The method of incorporating softening agents into rubber, which comprises subjecting raw rubber admixed with a liquid softening agent to the penetrating action of carbon dioxide gas at a depolymerizing temperature and under a gas pressure of 50 lbs./sq. in. and over and releasing the pressure to obtain a treated rubber having said softening agent substantially uniformly dispersed therein.

4. The method of simultaneously breaking down crude rubber and incorporating a softening agent therein, which comprises subjecting crude rubber and a softening agent in contact therewith in a confined atmosphere of carbon dioxide to a depolymerizing temperature and to a pressure of 50 lbs./sq. in. and over for a period of more than an hour and releasing said pressure to obtain a rubber that is broken down and therefore more readily milled and contains said softening agent substantially uniformly dispersed throughout the body of the rubber.

5. In a method of treating rubber, breaking down the rubber in the presence of carbon dioxide under elevated temperatures and pressures, said temperatures being not less than 330° F.

6. In a method of treating rubber, breaking down the rubber in the presence of carbon dioxide under elevated temperatures and pressures, said temperatures being not less than 330° F. and said pressures being not less than 50 lbs. pressure of the carbon dioxide.

7. A method of treating rubber, comprising the step of breaking down rubber by subjecting the rubber in an atmosphere of carbon dioxide to a temperature of not less than 330° F.

8. The process of treating rubber to break it down comprising the step of placing rubber in a closed vessel; the step of evacuating air at least partially from the vessel, and the step of introducing carbon dioxide to at least take the place of the air thus evacuated, and the step of subjecting the rubber while in the presence of carbon dioxide to depolymerizing temperatures, for instance, at not less than 330° F., or above.

9. In a method of treating rubber, placing rubber under a partial vacuum, adding carbon dioxide gas to restore the atmospheric condition in which the rubber is placed to at least atmospheric pressure, and elevating the temperature of the rubber and the gas in which the rubber is placed to depolymerizing temperature of at least 330° F. and working the rubber at such a temperature and under such a pressure.

10. In a method of treating rubber, placing the rubber in an atmosphere of carbon dioxide gas and elevating the temperature thereof to not less than 330° F. and maintaining that temperature for a sufficient period of time to soften or depolymerize the rubber.

11. In a method of treating rubber, adding softening agents to the rubber without any substantial mixing, placing the rubber in an enclosed vessel in the presence of carbon dioxide and depolymerizing the rubber and utilizing the carbon dioxide to carry the softening agents into the rubber by subjecting the carbon dioxide, softening agents and rubber to a temperature of not less than 330° F., which is the temperature of depolymerization of the rubber.

12. In a method of treating raw rubber, adding softening agents to the raw rubber without substantial mixing; placing the rubber in an enclosed vessel and partially evacuating the air from the vessel and the rubber; restoring the vessel to atmospheric pressure by adding carbon dioxide gas thereto; and elevating the temperature of the contents of the vessel until the depolymerizing temperature of rubber, of approximately not less than 330° F., is accomplished.

HENRY R. MINOR.